United States Patent
Kang

(10) Patent No.: US 9,967,294 B2
(45) Date of Patent: May 8, 2018

(54) SHARING OF MEDIA CONTENT

(71) Applicant: Google Inc., Mountain View, CA (US)

(72) Inventor: Thomas Kang, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 529 days.

(21) Appl. No.: 13/843,566

(22) Filed: Mar. 15, 2013

(65) Prior Publication Data

US 2014/0280567 A1    Sep. 18, 2014

(51) Int. Cl.
*G06F 15/16*  (2006.01)
*H04L 29/06*  (2006.01)

(52) U.S. Cl.
CPC ...... *H04L 65/1069* (2013.01); *H04L 65/1089* (2013.01); *H04L 65/4038* (2013.01); *H04L 65/4084* (2013.01)

(58) Field of Classification Search
CPC .............................. G06F 21/36; G06Q 10/10
See application file for complete search history.

(56) References Cited

U.S. PATENT DOCUMENTS

| | | | |
|---|---|---|---|
| 7,975,062 B2 * | 7/2011 | Krikorian et al. | 709/231 |
| 8,799,969 B2 * | 8/2014 | Krikorian et al. | 725/93 |
| 9,055,196 B2 * | 6/2015 | Hyun | G06F 17/30781 |
| 9,143,601 B2 * | 9/2015 | Padmanabhan | H04W 4/206 |
| 2008/0155063 A1 * | 6/2008 | Liwerant et al. | 709/219 |
| 2008/0208963 A1 * | 8/2008 | Eyal et al. | 709/203 |
| 2008/0229215 A1 | 9/2008 | Baron et al. | |
| 2009/0116812 A1 | 5/2009 | O'Brien et al. | |
| 2009/0132924 A1 * | 5/2009 | Vasa et al. | 715/723 |
| 2009/0328122 A1 | 12/2009 | Amento et al. | |
| 2011/0219413 A1 * | 9/2011 | Krikorian et al. | 725/109 |
| 2011/0271213 A1 | 11/2011 | Newman et al. | |
| 2012/0039513 A1 * | 2/2012 | Kennedy | G06Q 30/02 382/118 |
| 2012/0131002 A1 | 5/2012 | Rakshit | |
| 2012/0260298 A1 | 10/2012 | Chen et al. | |
| 2013/0346867 A1 * | 12/2013 | Woods | G11B 27/34 715/728 |

FOREIGN PATENT DOCUMENTS

KR    10-2013-0009446 A    1/2013

OTHER PUBLICATIONS

Bergeron, D., et al., "Annotations for Streaming Video on the Web: System Design and Usage Studies," Microsoft Research, 10 Pages, [online] [retrieved on Dec. 21, 2012] Retrieved from the internet <URL:http://research.microsoft.com/en-us/um/redmond/groups/coet/mras/www8/paper.htm>.

(Continued)

*Primary Examiner* — Umar Cheema
*Assistant Examiner* — Tesfu N Mekonen
(74) *Attorney, Agent, or Firm* — Lowenstein Sandler LLP

(57) ABSTRACT

A media sharing system stores share settings that identify one or more users with whom a sharing user wishes to share media segments created in the future. As a media item is being presented to the sharing user via a user device, the sharing user may request to share a segment of the media item. The media sharing system creates a segment of the media item. The media sharing system determines to share the segment with the identified users based on the stored share settings. The media sharing system shares the created segment with the identified users.

23 Claims, 3 Drawing Sheets

(56) References Cited

OTHER PUBLICATIONS

Greer, D., "Automatic Video Editing? Highlight Hunter App Seeks to Cut Your Time in Post," Premiumbeat.com, Apr. 3, 2012, 4 Pages, [online] [retrieved on Dec. 21, 2012] Retrieved from the internet <URL: http://www.premiumbeat.com/blog/automatic-video-editing-highlight-hunter-app-seeks-to-cut-your-time-in-post/>.
"Asterpix: Video Annotation," MakeUseOf, 2012, 2 Pages [online] [retrieved on Dec. 21, 2012] Retrieved from the internet <URL:http://www.makeuseof.com/dir/asterpix/>.
International Search Report and Written Opinion for International Application No. PCT /US2014/020332, dated Jun. 17, 2014, 11 pages.

\* cited by examiner

SHARING OF MEDIA CONTENT

BACKGROUND

Field

Described embodiments pertain in general to media content, and in particular to sharing media content.

Description of the Related Art

Through the use of the Internet, the viewing of videos has become a popular activity. Videos watched range from videos made by amateurs to movies made by professional studios. One aspect of video watching is that it is a private activity because a viewer typically has to devote all his attention to the video to be able to understand its content. Therefore, there is a minimal amount of human interaction while watching a video.

SUMMARY

The embodiments described herein provide methods, computer program products, and systems for sharing media content. In one embodiment, based on information received from a sharing user, a media sharing system stores share settings that identify one or more users with whom the sharing user wishes to share media segments created in the future. As a media item is being presented to the sharing user via a user device, the sharing user may request to share a segment of the media item. In one embodiment, when making the request, the sharing user does not specify the segment to share or which users to share the segment with.

The media sharing system creates a segment of the media item. The media sharing system determines to share the segment with the identified users based on the stored share settings. The media sharing system shares the created segment with the identified users. In one embodiment, the media sharing system shares the segment through a social networking system.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Described embodiments provide methods, computer program products, and systems for sharing a media segment (also referred to as "segment") of a media item (may also be referred to as "media content") while the media item is being presented to a user.

An interface is presented to a user that plays a media item (e.g., a video) requested by the user. As the media item is playing and being presented to the user, the user can request to share a segment of the item by, for example, using an icon or button included in the interface. In one embodiment, when the user makes the request, the user does not specify the exact segment of the item to share or which users to share the segment with. The media item continues playing and the requesting user is not interrupted with a request for further instructions.

However, as the media item is playing and without it being visible to the user, a segment of the media item is created. The created segment is a portion of the media item that starts, for example, 20 seconds prior to a share time and ends at the share time. In one embodiment, the share time is a time in the item when the user made the request. In one embodiment, the created segment is shared with users of a social networking system (e.g., with the user's social networking friends). Therefore, while the media item is being presented to the user, the user can have social interactions with other users without being distracted from the media item.

Figure 1:
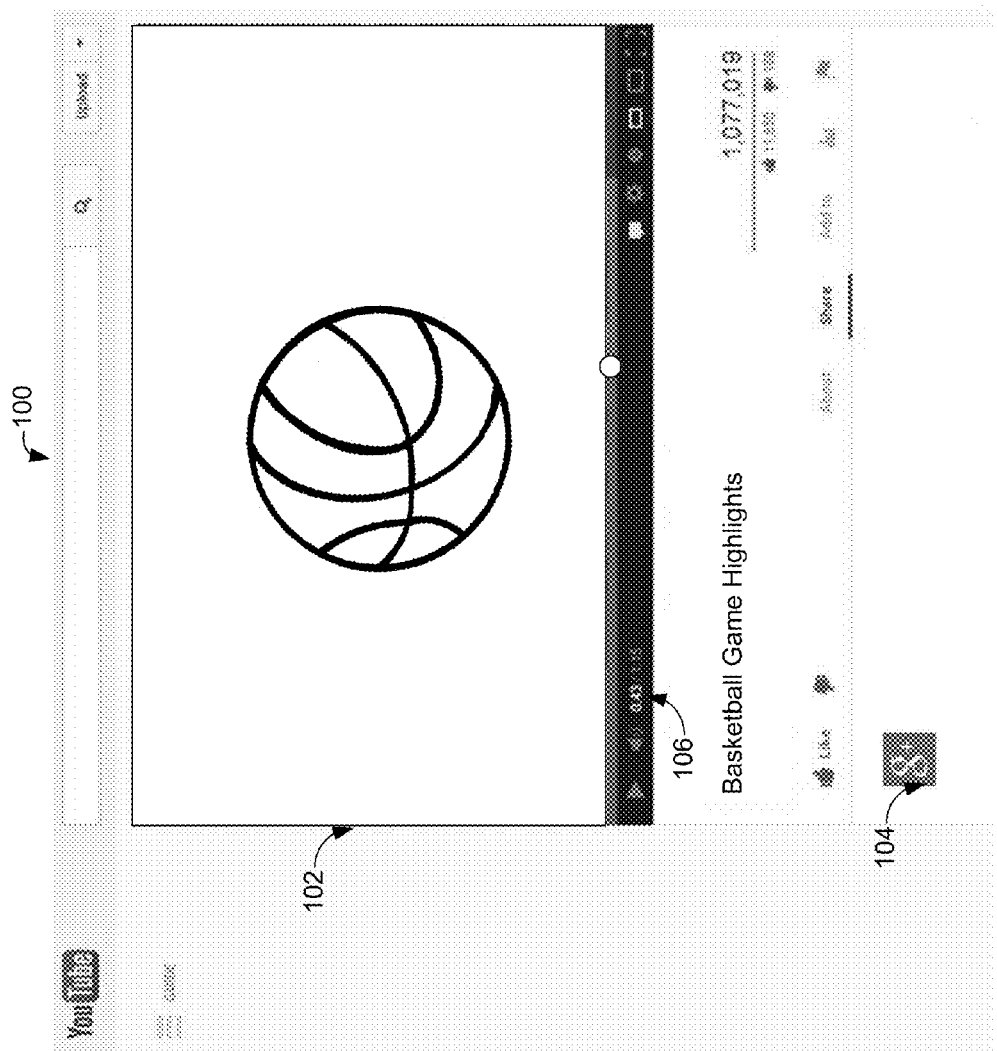
FIG. 1 is an example of an interface through which a user can share a media segment of a media item while the media item is being presented to the user according to one embodiment.

As an example, FIG. 1 illustrates an interface 100 playing a video 102 with highlights from a basketball game. Assume that the video 102 includes a spectacular dunk at time of 0:41 of the video and the user watching the video 102 wants to share it with friends. The user selects interface element 104 at the time of 0:43 as illustrated by reference 106 in order to share the dunk. Therefore, the time 0:43 is considered to be the share time. As the video 102 continues playing and without the involvement of the user, a segment of the video is created that starts a set amount of time prior to the share time (e.g., 10 seconds prior to 0:43) and ends at the share time or set amount of time after the share time (e.g., 5 seconds after 0:43). Since the request was made right after the user watched the dunk, there is a good probability that segment will include the dunk. The segment is shared with social networking friends of the user.

Figure 2:
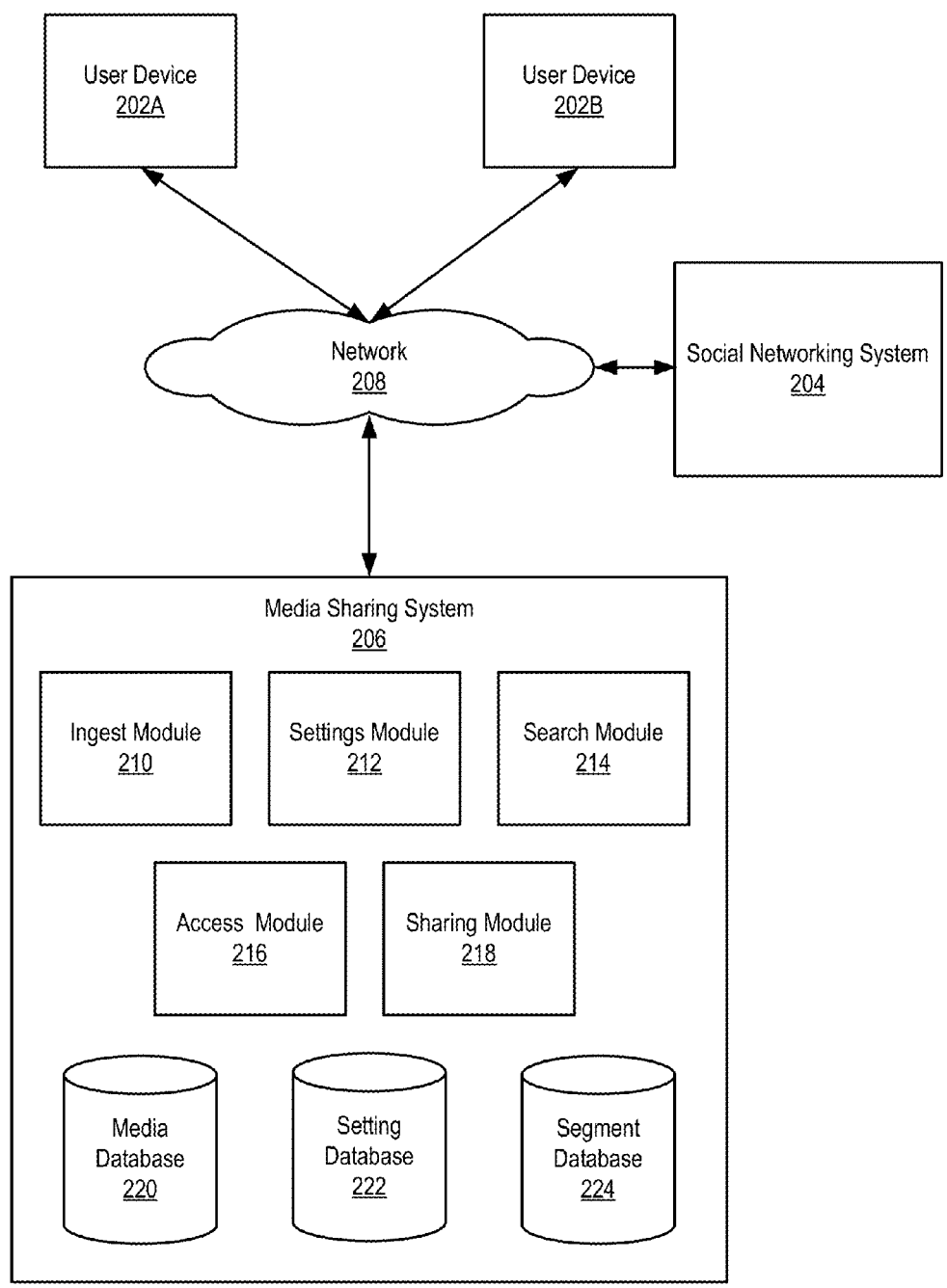
FIG. 2 is a block diagram of a media sharing environment according to one embodiment.

FIG. 2 is a block diagram of a media sharing environment 100 according to one embodiment. The environment 100 includes two user devices 202, a social networking system 204, and a media sharing system 206 connected by a network 208. Although the illustrated environment 100 only includes a select number of each entity, other embodiments can include more or less of each entity (e.g., millions of user devices 202).

FIG. 2 uses like reference numerals to identify like elements. A letter after a reference numeral, such as "202A," indicates that the text refers specifically to the element having that particular reference numeral. A reference numeral in the text without a following letter, such as "202," refers to any or all of the elements in the figures bearing that reference numeral (e.g. "202" in the text refers to reference numerals "202A" and/or "202B" in the figures).

The network 208 represents the communication pathway between the user devices 202, the social networking system 204, and the media sharing system 206. In one embodiment, the network 208 is the Internet and uses standard communications technologies and/or protocols. The network 208 can also utilize dedicated, custom, or private communications links that are not necessarily part of the Internet. The network 208 may comprise any combination of local area and/or wide area networks, using both wired and wireless communication systems.

A user device 202 has computing functionality and data communication capabilities. The user device 202 can receive inputs from a user and can transmit and receive data via the network 208. In one embodiment, the user device 202 is a computing system, such as a personal computer, mobile phone, personal digital assistant (PDA), a television, television "set-top box," etc.

Through a user device 202 a user can interact with other users of the social networking system 204. Additionally, through a user device 202 a user can browse through a library of media items available from the media sharing system 206 and can request media items from the system 206 for presentation on the device 202. In one embodiment, a user device 202 includes a web browser through which webpages may be accessed that include a media player (e.g., Flash™ from Adobe Systems, Inc.). The media player plays media items received from the media sharing system 206. In one embodiment, the media player is an application installed on the user device 202.

The social networking system 204 allows users of the system 204 to interact with each other. In one embodiment, the social networking system 204 creates and stores a profile for each user of the system 204. A user's profile includes information about the user that was explicitly and voluntarily shared by the user. Examples of information included in a user profile include biographic information, demographic information, work experience, educational history, gender, and hobbies.

A user profile may also include content (e.g., statements, comments, media items) provided by the respective user of the profile for sharing with other users. A user may also post content on another user's profile.

Through the social networking system 204, users may create different types of groups. Each group (may also be referred to as a "circle") includes one or more users of the social networking system 204. A user may create groups based on real-life relationships. For example, a user may create a group for friends, a group for family members, one for acquaintances, and another for study buddies. In one embodiment, a user can include another user in more than one of his groups.

A user can use the groups he creates to control which users have access to content provided by the user to the social networking system 204. In one embodiment, when a user provides content to the social networking system 204, the user specifies which groups to share the content with. For example, a user may add a photo to his profile and request that only users of his friends group have the ability to see the picture. As another example, a user may request that a message be sent to the users of his study buddy group.

The media sharing system 206 provides users with access to media items. The types of media items that users may obtain from the media sharing system 206 include videos, audio files (e.g., music, audio books, podcasts), broadcasts (e.g., television or radio), movies, animations, multimedia presentations, and media items in any other type of medium. In one embodiment, the media items that the media sharing system 206 makes accessible are media items provided by users of the system 206. The media items made accessible may also include media items identified in searches or crawls of websites or databases of other entities.

The media sharing system 206 includes an ingest module 210, a settings module 212, a search module 214, an access module 216, a sharing module 218, a media database 220, a setting database 222, and a segment database 224. The ingest module 210 allows users to provide media items for accessibility by other users. In one embodiment, a user can request to upload a media item through a user device 202. A request to upload a media item means that the user wants other users of the system 206 to have the ability to access the item.

When a user requests to upload a media item, the ingest module 210 provides the user with an interface to provide information about the item. In one embodiment, the information provided by the user includes a title of the media item, a description of the item, keywords associated with the item, and a location where the item is currently stored on the user's device 202. Once the user has provided the information, the ingest module 210 stores the media item in the media database 220 along with the information provided for the item. The media database 220 stores media items that are accessible to users of the media sharing system 206. Therefore, when the ingest module 210 stores a media item in the media database 220, the media item is available for users to access.

The settings module 212 allows users to set up their share settings. As described above, as a media item is being presented to a user, the user can request to share a segment of the media item. When such a request is made, a segment is created and shared without interrupting the user's enjoyment of the media item. For the user to be able to share without being interrupted, the user sets up his share settings that specify how media segments should be shared.

In one embodiment, a user sets up his share setting when the user registers to use the services of the media sharing system 206. After registering, a user can update his share settings at any point. Users' share settings are stored in the setting database 222.

For a user to setup his share settings, the settings module 212 transmits an interface to the user's device 202 for presentation to the user. In the interface the user can setup his respective share settings. In one embodiment, in the interface as a share setting, the user specifies the total duration (i.e., the total length) that shared segments of media items should be. Each media item has a total duration and a media segment of a media item has a total duration that is less than that of the media item. In other words, a segment is a portion of a media item with a shorter duration than that of the item.

In one embodiment, the user specifies the total duration that media segments should be by providing a start time and end time that is relative to a share time. In one embodiment, the share time is a time in a media item when the user makes a request to share a segment. For example, the user may indicate that for a segment, the start time should be 10 seconds before the share time of the corresponding media item when the user made the share request. Additionally, the user may indicate that the end time be 2 seconds after the share time. Therefore, in this example, the total duration of media segments would be 12 seconds.

In one embodiment, in the interface as a share setting the user identifies which one or more users he wishes to share segments created in the future with. The user may identify users of the social networking system 204. In one embodiment, with permission from the user, the settings module 212 may obtain information from the social networking system 204 on groups of users created by the user with the social networking system 204. The user may identify one or more groups with which to share segments.

In one embodiment, the user may identify different users and/or groups with which to share segments depending on information of the media item being presented to the user when the user makes the share request. The media item information used in deciding who to share a media segment with may include: the subject matter of the item, the user that uploaded the item, the number of users that have liked the item, the number of comments the item has received, and which users have commented. For example, the user may specify that if a media item is related to basketball, share with my basketball friends group. However, if the item is related to religion, share with my church group. As another example, the user may indicate that if a media item is uploaded by one of the users in his friends group, to share segments of the item with the other users of the friends group.

In one embodiment, the user may identify different users and/or groups with which to share segments depending on circumstances surrounding the presentation of a media item when the user makes the share request. The circumstances used in deciding who to share a segment of the item with may include: the time of day when the request is made (e.g., morning or afternoon), the geographical location of the user when the request is made (e.g., home or at work), and the type of device 202 used by the user to make the request (e.g., mobile phone or personal computer). As an example, a user may specify that if a share request is made during work hours, to share with his coworkers group. Further, the user may specify that if the share request is made outside of work hours, to share with his friends group.

In one embodiment, in the interface the user specifies the means through which segments of media items should be shared. In one embodiment, the user indicates whether a segment should be shared in a message (e.g., message via the social networking system 204, an email or a text message sent directly to identified users), by posting the segment on social networking profiles of identified users, or by posting the segment on the user's own profile and only making the segment accessible to identified users.

Once the user is finished specifying the share settings in the interface, the settings module 212 stores the share settings in the setting database 222. As described above, the user can update his share settings at any time.

The search module 214 processes search queries received from users of the media sharing system 206. If a user is interested in accessing a media item, the user may submit a search query that includes keywords or phrases related to the media item. When the search module 214 receives a query from the device 202 of a user, the search module 214 searches the information of media items stored in the media database 220 for media items that match the query. The search module 214 provides to the device 202 for presentation to the user a list of the media items that best match the query. From the list, the user can request to access a specific media item.

The access module 216 processes user requests to access media items. When a user requests to access a specific media item, the access module 216 identifies the media item in the media database 220. The access module 216 transmits the requested media item to the device 202 of the user for presentation in an interface. In one embodiment, the interface is a webpage that includes a media player that plays the received media item. In one embodiment, the interface is that of a media player installed on the user device 202.

In one embodiment, the access module 216 instructs the user device 202 to include in the interface an interface element through which the user may make a request to share segments of the media item. The interface element may be, for example, a button or icon.

The sharing module 218 processes requests to share segments of media items. As a media item provided by the media sharing system 206 is being presented to a user on his respective device 202, the user can request to share a segment of the media item. When such a request is made, the sharing module 218 receives information about the presentation from the user's device 202. In one embodiment, the sharing module 218 receives information on one or more of the following: the user to whom the media item is being presented, the media item being presented, and a share time.

The sharing module 218 creates a segment of the media item based on the information received from device 202 and the user's share settings stored in the setting database 222. To create a segment of the media item, the sharing module 218 identifies in the user's share settings the start and end times of segments relative to the share time. The sharing module 218 creates a segment that is a portion of the media item. In one embodiment, the portion of the item starts a set amount of time prior to the share time and ends at the share time or a set amount of time after. In one embodiment, the sharing module 218 stores a copy of the created segment in the segment database 224 which includes segments created by the sharing module 218.

The sharing module 218 determines based on the user's share settings which users to share the created segment with. Additionally, the sharing module 218 determines based on the share settings what means to use for sharing the segment. If the share settings indicate to share the created segment with the identified users through the social networking system 204, the sharing module 218 transmits the created segment to the social networking system 204. The sharing module 218 instructs the social networking system 204 to share the segment with the identified users as specified in the sharing user's settings. For example, based on the user's share settings, the social networking system 204 may post the segment on the identified users' profiles or add the segment to the sharing user's profile and give the identified users access to the segment.

If the share settings indicate to share the segment directly with the identified users and not go through the social networking system 204, the sharing module 218 communicates directly with the identified users to share the segment. For example, the sharing module 218 may prepare a text message or email that includes the segment and send it to the identified users.

In one embodiment, at any time a user can review the segments that have been created at the user's request. For example, after a user has finished watching a video, the user can ask to review the segments of the video that he shared while watching the video. When a user requests to view media segments created at the user's request, the sharing module 218 transmits to the user's device 202 a list of segments stored in the segment database 224 and created at the user's request.

If the user requests to share a segment with additional users than those with whom the segment has already been shared, the sharing module 218 shares the segment with the additional users. If the user requests to edit a segment in the segment database 224 (e.g., by making it longer or shorter), the sharing module 218 edits the segment in the segment database 224 according to the user's instructions.

In one embodiment, if a user with whom a media segment is shared requests to edit the segment, the sharing module 218 edits the segment in the segment database 224 according to the request (i.e., a user with whom a segment is shared has the ability to edit the segment). In one embodiment, such a user can only edit the segment if the sharing user has given him permission. In one embodiment, the user with whom the segment is shared is limited in the edits he may make to the segment. For example, the user may not be allowed to increase or decrease the duration of the segment by more than a set amount.

In other embodiments, steps described above as being performed by the media sharing system 206 or by the modules of the media sharing system 206 can be performed by a device 202 of a user. For example, as a media item is being presented on a user device 202, if a user of the device 202 makes a request to share a segment of the media item, the user device 202 may create the segment. Additionally, the user device 202 may communicate directly with identified users or the social networking system 204 to share the created segment.

Figure 3:
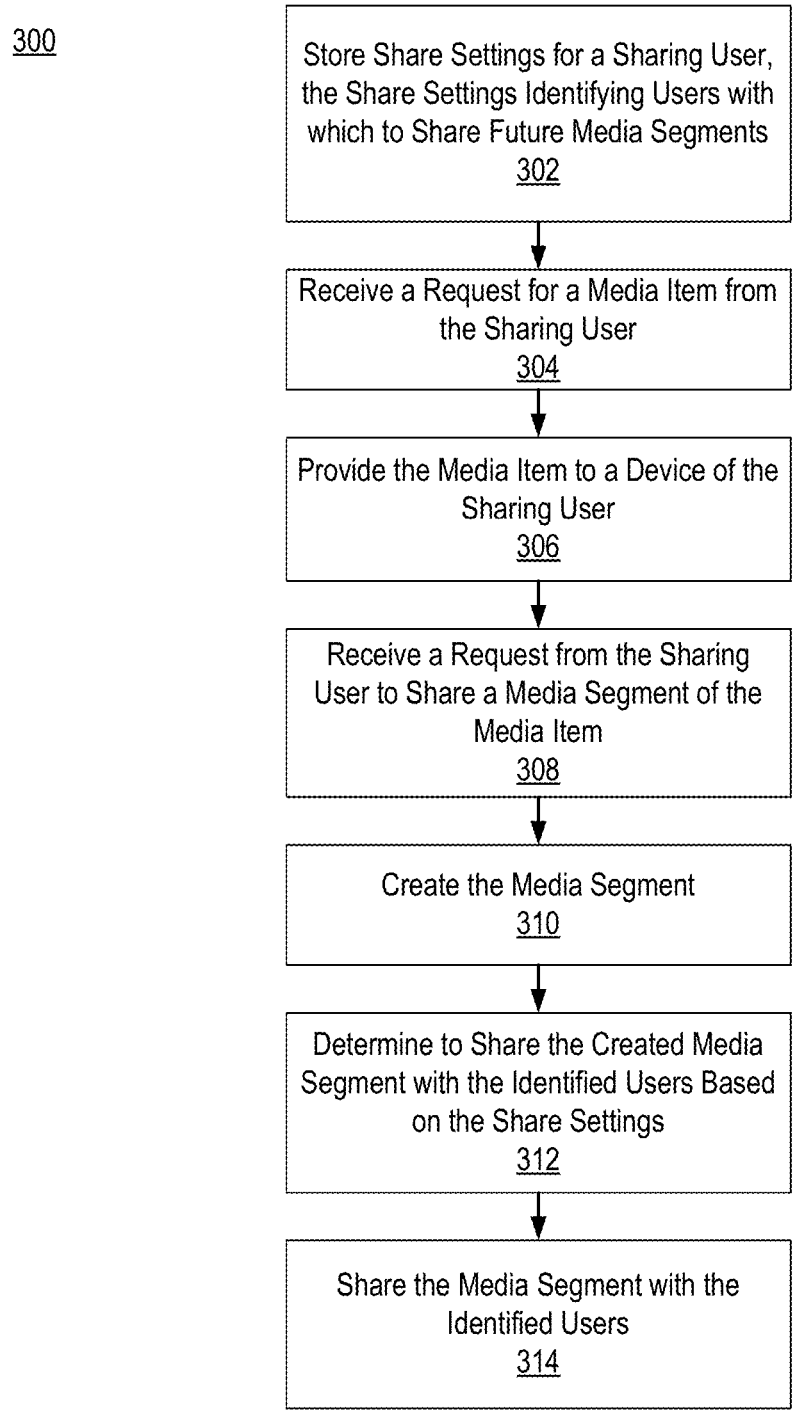
FIG. 3 is a flow chart illustrating a process of sharing a media segment of a media item while the media item is being presented to a user according to one embodiment.

FIG. 3 is a flow chart illustrating a process 300 of sharing a media segment of a media item while the media item is being presented to a user according to one embodiment. Those of skill in the art will recognize that other embodiments can perform the steps of FIG. 3 in different orders. Moreover, other embodiments can include different and/or additional steps than the ones described herein.

Assume for purposes of this example that an interface is presented to a user (sharing user) of the media sharing system 206. In the interface the sharing user can specify how media segments should be shared. The media sharing system 206 stores 304 share settings for the sharing user that include information provided in the interface. In one embodiment, the information provided in the interface and stored includes an identification of one or more users (identified users) with which to share media segments created in the future.

The media sharing system 206 receives 304 a request for a media item from the sharing user. The media sharing system 206 provides 306 the media item to a device 202 of the sharing user. The media item is presented to the user through an interface. In one embodiment, the interface includes an interface element through which the user can request to share a segment of the media item.

The media sharing system 206 receives 308 a request from the sharing user to share a media segment of the media item. As the media item continues to be presented to the user, the media sharing system 206 creates 310 the media segment. The media sharing system 206 determines 312 to share the created media segment with the identified users based on the stored share settings. The media sharing system 206 shares 314 the media segment with the identified users. In one embodiment, the media sharing system 206 shares the segment with the identified users through the social networking system 204.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

The invention claimed is:

1. A computer-implemented method for sharing video content, the method comprising:
   storing, by a media sharing system for a first user, share settings comprising a first amount of time, a second amount of time, and an indication that media related to a second subject matter corresponds to a second user and media related to a third subject matter corresponds to a third user;
   receiving, by the media sharing system over a network from a first user device and while a video is being presented to the first user on the first user device, a request by the first user to share a segment of the video;
   responsive to the receiving of the request and while the video is being presented to the first user, automatically:
      determining, by the media sharing system, a share time indicating a point in the video presented to the first user when the request was made by the first user;
      determining, by the media sharing system, a start time of the segment to be the first amount of time prior to the share time;
      determining, by the media sharing system, an end time of the segment to be the second amount of time after the share time;
      identifying, by the media sharing system, the second user based on the share settings and in response to determining that the video is related to the second subject matter; and
      sharing, by the media sharing system, the segment with the second user in response to the identifying of the second user, the segment including content of the video between the start time and the end time, the segment not including content of the video prior to the start time and after the end time.

2. A computer-implemented method for sharing media content, the method comprising:
   storing, by a media sharing system for a first user, share settings comprising a first amount of time, a second amount of time, and an indication that media related to a second subject matter corresponds to a second user and media related to a third subject matter corresponds to a third user;
   receiving, by the media sharing system over a network from a first user device and while a media item is being presented to the first user on the first user device, a request by the first user to share a media segment of the media item;
   responsive to the receiving of the request and while the media item is being presented to the first user, automatically:
      determining, by the media sharing system, a share time indicating a point in the media item presented to the first user when the request was made by the first user;
      determining, by the media sharing system, a start time of the media segment to be the first amount of time prior to the share time;
      determining, by the media sharing system, an end time of the media segment to be the second amount of time after the share time;
      identifying, by the media sharing system, the second user based on the share settings and in response to determining that the media item is related to the second subject matter; and
      sharing, by the media sharing system, the media segment with the second user in response to the identifying of the second user, the media segment including content of the media item between the start time and the end time, the media segment not including content of the media item prior to the start time and after the end time.

3. The method of claim 2, wherein a total duration of the media segment is less than a total duration of the media item.

4. The method of claim 2, wherein the second user is part of a group created with a social networking system.

5. The method of claim 2, wherein the share settings further comprise a second indication that media segments to be shared via a first type of user device correspond to the second user and media segments to be shared via a second type of user device corresponds to the third user, wherein the identifying of the second user is further in response to determining that the first user device is the first type of user device.

6. The method of claim 2, wherein the share settings further comprise a second indication that media uploaded by the third user corresponds to the second user and media uploaded by a fourth user corresponds to a fifth user, wherein the identifying of the second user is further in response to determining that the media item was uploaded by the third user to media sharing system.

7. The method of claim 2, wherein the share settings further comprise a second indication that media segments to be shared by the first user during a second time period correspond to the second user and media segments to be shared by the first user during a third time period correspond to the third user, wherein the identifying of the second user is further in response to determining a time of day when the request was made by the first user and determining that the time of day is within the second time period.

8. The method of claim 2, wherein the share settings further comprise a second indication that media segments to be shared by the first user from a second geographical location correspond to the second user and media segments to be shared by the first user from a third geographical location correspond to the third user, wherein the identifying of the second user is further in response to determining that the first user requested to share the media segment from the second geographical location.

9. The method of claim 2, wherein sharing the media segment comprises:
   transmitting instructions to a social networking system to include the media segment in a social networking profile of the second user.

10. The method of claim 2, wherein sharing the media segment comprises:
    transmitting instructions to a social networking system to include the media segment in a social networking profile of the first user and provide the second user access to the media segment on the profile.

11. The method of claim 2, wherein sharing the media segment comprises:
    transmitting a message to the second user that includes the media segment.

12. A computer program product having a non-transitory computer-readable storage medium having computer-executable instructions which when executed by one or more processors, cause the one or more processors to perform operations comprising:
    storing for a first user, share settings comprising a first amount of time, a second amount of time, and an indication that media related to a second subject matter corresponds to a second user and media related to a third subject matter corresponds to a third user;
    receiving, by a media sharing system from a first user device over a network and while a media item is being presented to the first user on the first user device, a request by the first user to share a media segment of the media item;

in response to the receiving of the request and while the media item is being presented to the first user, automatically:

determining, by the media sharing system, a share time indicating a point in the media item presented to the first user when the request was made by the first user;

determining, by the media sharing system, a start time of the media segment to be the first amount of time prior to the share time;

determining, by the media sharing system, an end time of the media segment to be the second amount of time after the share time;

identifying, by the media sharing system, the second user based on the share settings and in response to determining that the media item is related to the second subject matter; and sharing, by the media sharing system, the media segment with the second user in response to the identifying of the second user, the media segment including content of the media item between the start time and the end time, the media segment not including content of the media item prior to the start time and after the end time.

13. The computer program product of claim 12, wherein a total duration of the media segment is less than a total duration of the media item.

14. The computer program product of claim 12, wherein the second user is part of a group created with a social networking system.

15. The computer program product of claim 12, wherein the share settings further comprise a second indication that media requested via a first type of user device corresponds to the second user and media requested via a second type of user device corresponds to the third user, wherein the identifying of the second user is further in response to determining that the first user device is the first type of user device.

16. The computer program product of claim 12, wherein the share settings further comprise a second indication that media uploaded by the third user corresponds to the second user and media uploaded by a fourth user corresponds to a fifth user, wherein the identifying of the second user is further in response to determining that the media item was uploaded by the third user to media sharing system.

17. The computer program product of claim 12, wherein the share settings further comprise a second indication that media shared by the first user during a second time period corresponds to the second user and media shared by the first user during a third time period corresponds to the third user, wherein the identifying of the second user is further in response to determining a time of day when the request was made by the first user and determining that the time of day is within the second time period.

18. The computer program product of claim 12, wherein the share settings further comprise a second indication that media shared by the first user from a second geographical location corresponds to the second user and media shared by the first user from a third geographical location corresponds to the third user, wherein the identifying of the second user is further in response to determining that the first user requested to share the media segment from the second geographical location.

19. A method for sharing media content, the method comprising:

storing, for a first user, share settings comprising a first amount of time, a second amount of time, and an indication that media related to a second subject matter corresponds to a second user and media related to a third subject matter corresponds to a third use;

displaying, by a client device, in a user interface a media item to the first user;

receiving, by the client device, a selection of a user interface element by the first user during the displaying of the media item;

responsive to the receiving of the selection and during the displaying of the media item, automatically:

determining, by the client device, a share time indicating a point in the media item displayed to the first user when the first user selected the user interface element;

determining, by the client device, a start time of a media segment to be the first amount of time prior to the share time;

determining, by the client device, an end time of the media segment to be the second amount of time after the share time;

identifying, by the client device, the second user based on the share settings and in response to determining that the media item is related to the second subject matter; and sharing, by the client device, the media segment with the second user via a communications network in response to the identifying of the second user, the media segment including content of the media item between the start time and the end time, the media segment not including content of the media item prior to the start time and after the end time.

20. The method of claim 19 wherein the media item is a video.

21. The method of claim 19 wherein the user interface element is an icon.

22. The method of claim 19 wherein the media segment is shared with a group of users of a social networking system that includes the second user.

23. A computer program product for sharing media content, the computer program product stored on a non-transitory computer readable medium and including instructions adapted to cause a processor to execute steps comprising:

storing, for a first user, share settings comprising a first amount of time, a second amount of time, and an indication that media related to a second subject matter corresponds to a second user and media related to a third subject matter corresponds to a third user;

displaying, by a client device, a media item in a user interface to the first user;

receiving, by the client device, a selection of a user interface element by the first user during the displaying of the media item;

responsive to the receiving of the selection and during the displaying of the media item, automatically:

determining, by the client device, a share time indicating a point in the media item displayed to the first user when the first user selected the user interface element;

determining, by the client device, a start time of a media segment to be the first amount of time prior to the share time;

determining, by the client device, an end time of the media segment to be the second amount of time after the share time;

identifying, by the client device, the second user based on the share settings and in response to determining that the media item is related to the second subject matter; and sharing, by the client device, the media segment with the second user via a communications network in response to the identifying of the second user, the media segment including content of the media item between the start time and the end time, the media segment not including content of the media item prior to the start time and after the end time.

* * * * *